United States Patent [19]
Myers

[11] 3,892,384
[45] July 1, 1975

[54] DOUBLE SEATED CAGE VALVE WITH FLEXIBLE PLUG SEAT

[75] Inventor: Edward B. Myers, Oreland, Pa.

[73] Assignee: Honeywell Inc., Minneapolis, Minn.

[22] Filed: Apr. 12, 1974

[21] Appl. No.: 460,456

[52] U.S. Cl. ............... 251/282; 251/334; 251/362
[51] Int. Cl. ............................................. F16k 1/44
[58] Field of Search..... 137/625.35, 625.36, 625.34; 251/282, 334, 362, 330

[56] References Cited
FOREIGN PATENTS OR APPLICATIONS
609,513   2/1935   Germany ..................... 137/625.35
850,833   9/1952   Germany .......................... 251/282

*Primary Examiner*—Arnold Rosenthal
*Attorney, Agent, or Firm*—Arthur H. Swanson; Lockwood D. Burton; John Shaw Stevenson

[57] ABSTRACT

A unitary plug of a double seated cage valve is provided with a tapered tube shaped seat made of resilient material. This resilient tapered tube shaped plug seat provides a surface of increasing circumference thereon, which can be progressively forced into fluid tight seating contact against an associated annular rigid edge cage seat to enable the remaining seat on the plug to be automatically coined into fluid tight seating contact with its associated rigid edge cage seat.

3 Claims, 3 Drawing Figures

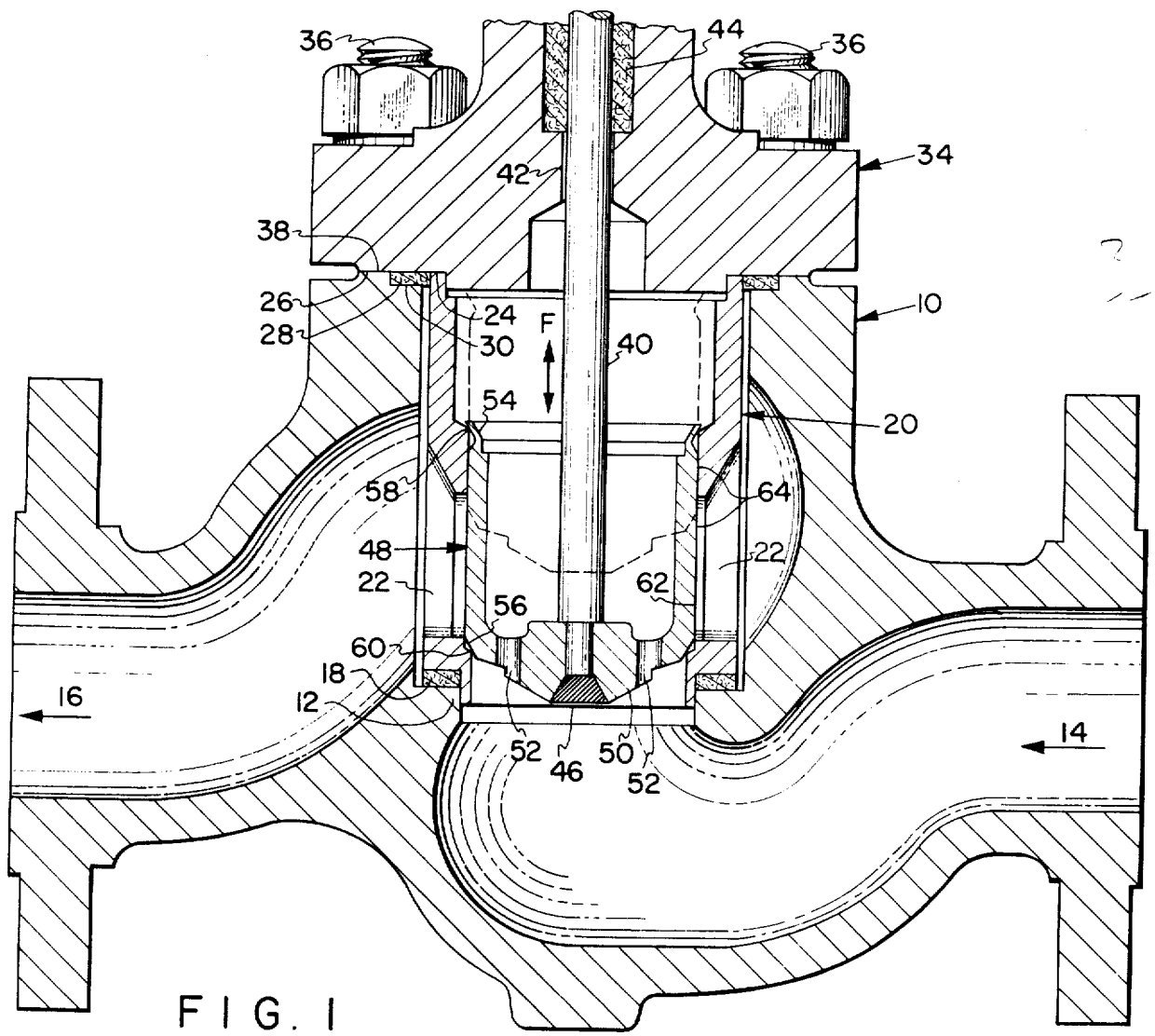
FIG. I
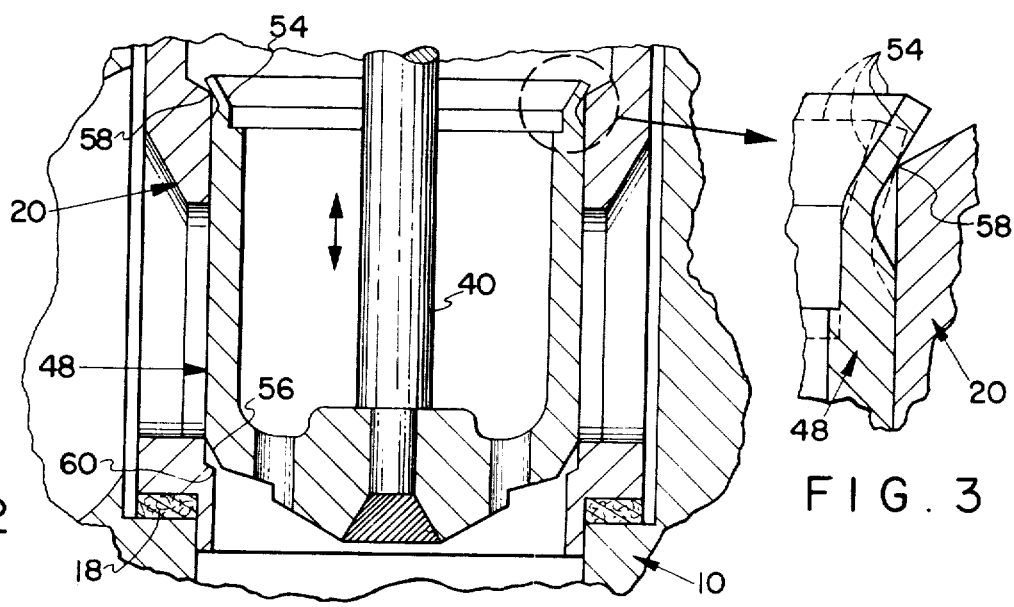
FIG. 2
FIG. 3

DOUBLE SEATED CAGE VALVE WITH FLEXIBLE PLUG SEAT

BACKGROUND OF THE INVENTION

1. Field of the Invention

The invention relates to valves used in industrial processes and has particular reference to a double seated cage valve having a plug that has a flexible deformable seat of the type generally classified in the United States Patent Office with valves and valve actuation valves retained by seat deformation (Class 251 – 365).

2. Description of the Prior Art

In order to make a double seated valve, as shown in U.S. Pat. No. 3,601,147, of a leak tight construction, it has heretofore been necessary to select a cage and a plug for this valve that have their top and bottom seating surfaces precisely spaced relative to one another.

Since it has been practically impossible to select a cage and a plug which have identically spaced upper and lower seating surfaces it has heretofore been the common practice to machine the upper and/or lower seating surface of the cage in a so-called letting-in fashion and to then perform a grinding lapping-in operation on these seating surfaces of the cage in order to bring the distance between the top and bottom seating surfaces of the cage into alignment with associated seating surfaces of the plug. Since this letting-in and grinding lapping-in operation adds considerably to the cost of manufacturing such double seated cage valves, other substitute valves which do not require the aforementioned letting-in and lapping-in operations have been developed.

One of the aforementioned substitute valves is shown in the John R. Curren U.S. Pat. No. 3,722,860. That arrangement does away with the upper seat on the cage and plug and, instead, mounts an annular plastic or rubber ring seat on an upper, outer cylindrical wall surface of the plug for slidable sealing contact with the inner annular wall of the cage. Since the aforementioned ring seals are constructed of a plastic or rubber material they experience a permanent set when such valves are employed to control the flow of high temperature fluids. That high temperature will thus cause the ring seat to be distorted and thereby cause it to lose its desirable resilient sealing characteristics.

SUMMARY OF THE INVENTION

It is one of the objects of the present invention to provide a double seated cage valve construction that will eliminate the costly so called letting-in machine operation and the grinding lapping-in operation presently required to align the spaced seating surfaces of the plug with the seating surfaces of the cage and will also provide improved leak tight control particularly when such a valve is used to control the flow of an unusually high temperature fluid.

In carrying out the aforementioned object and other objects of the invention there is herein presented a unitary hollow plug which includes a resilient, deformable inverted frusto-conical shaped or beveled seat for one of the seats of a double seated valve instead of employing two rigid valve seats as shown in the aforesaid U.S. Pat. No. 3,601,147. The elastic or resilient, deformable, beveled seat arrangement allows the upper seating surfaces between the plug and cage to be initially seated before the lower seating surface of the plug and cage are engaged and thereafter allows successive increasing annular line seating portions of the upper leveled seating surface of the plug to be compressed and resiliently deformed whereby the top and bottom seats of the plug can be moved into fluid tight contact with the associated seats of the cage.

BRIEF DESCRIPTION OF THE DRAWINGS

A better understanding of the present invention may be had when the following detailed description is read in connection with the accompanying drawing in which:

FIG. 1 is a cross-sectional view of an improved cage valve embodying the present invention;

FIG. 2 is a cross-sectional view, on a somewhat larger scale, of the upper and lower plug and cage seats when the plug is in a partially closed position; and FIG. 3 is a further enlarged cross-sectional view of the resiliently deformable upper plug seat in sealing engagement with the associated cage seat.

DESCRIPTION OF THE PREFERRED EMBODIMENT

For an understanding of the preferred embodiment of the invention reference will be first made to FIG. 1.

The unitary valve body 10 is provided with a shoulder 12 separating the inlet and outlet passageways 14, 16. A seat ring 18 rests on the circular shoulder 12. Positioned concentrically with and directly above the seat 18 is a hollow cylindrical cage 20 through which openings 22 communicate with the outlet passageway 16.

The upper cylindrical surface or top rim 24 of the unitary cage 20 is co-planar with the upper suface of a shoulder 26 formed on the upper end of the body 10. A ring shaped gasket 28 rests on an annular top wall portion 30 of the body 10 and between the top rim 24 of cage 20 and the shoulder 26.

A bonnet is secured to the valve body 10 by a plurality of tap bolts 36. Two of these tap bolts 36 are shown fixedly securing the surface 38 of bonnet 34 against the gasket 28 and against the upper surface of the shoulder 26 formed at the top of the valve body 10.

A stem 40 is shown passing through a cylindrical opening 42 and packing 44 in the bonnet 34. The upper end of the stem 40 is connected to any suitable actuator, not shown, for movement in a vertical direction.

The stem 40 is connected at its lower end 46 as by welding, to a semi-balanced hollow unitary plug 48. The plug 48 includes a conical shaped base portion 50 and a plurality of openings 52 through the base portion 50.

The plug 48 basically includes a rigid cylindrical body 62 bridged at the lower end by the conical base 50. The cylindrical body 62 terminates at the upper end in a flared, frusto-conical seating surface portion 54. The seating surface portion 54 is made substantially thinner than the rigid body portion 62 of the plug 48, thereby rendering that portion resiliently deformable. A further seating surface 56 is formed at the junction of the lower end of the cylindrical body 62 and conical base 50. The seating surface 56 will, of course, be rigid as compared to the resilient upper seating surface 54.

The upper and lower ends of the unitary cage 20 are each provided with a sharp edge which form annular line seating edge surfaces 58, 60, respectively.

The cage 20 and the plug 48 are preferably made of stainless steel. It should, however, be understood that the plug and cage can be constructed of other materials that have suitable physical characteristics and which can be employed to control the flow of different types of liquids and gases over a wide temperature and pressure range.

In FIG. 1, there is illustrated, in dash line form, the unseated position of the plug seats 54, and 56 when the plug 48 is in a fully opened position.

In FIG. 2, there is illustrated a second position of the plug 48 after it has been lowered from the dotted line or unseated position shown in FIG. 1. In this lowered position, the upper resilient, deformable inverted frustoconical or beveled upper seat 54 is seated against the annular line seating edge surface 58 of the cage 20, the lower seat 56 being in an unseated position with respect to the annular line seat 60 of the cage 20.

Also shown in FIG. 1, in solid line form, is a third or fully seated position of the plug 48 when the upper and lower seats 54, 56 are in fluid tight engagement with the annular sharp seating edges 58, 60 of the cage 20.

The enlarged sectional view shown in FIG. 3, illustrates, in solid line form, the upper seating surface 54 of the plug 48 when it initially contacts the upper, stationary contacting seating surface 58 of the cage 20. There further shows, in dash line form, the deformed position of the resilient frustoconical shaped seat 50 of the plug 48 when the plug 38 is in the fully seated position shown in FIG. 1.

MODE OF OPERATION

The outer cylindrical surface 62 of the valve plug 48 is arranged for sliding movement along the inner cylindrical surface 64 of the cage 20 by means of the stem 40 and an actuator, not shown, connected to the upper end of the stem 40. When a force is applied to the valve stem 40 to move it and the associated plug 48 in a downward direction, the plug 48 will be moved from its unseated, dash line, position to its fully seated, solid line, position as shown as FIG. 1.

During that downward movement, the upper resilient plug seat 54 will first be moved into annular line contact with an annular seating edge surface 58 of the cage 20; the lower seat 56 will be in an unseated position with respect to the lower cage seat 60, as shown in FIG. 2.

As the downward force of the aforementioned actuator continued to be applied by way of stem 40 to the plug 48, the annular resilient upper seat 54 of the plug 48 will be compressed and forced to move in a radially inward direction by the annular rigid edge 58 comprising the upper seat of cage 20.

Inward compression of the resilient frusto-conical or beveled seat 54 thus continues from the time the plug seat 54 engages the annular edge of the upper cage seat 58, as shown in solid line form in FIG. 3, until it has been moved downward to the solid line position shown in FIG. 1 and as shown in the - line position of FIG. 3.

The plug 48 is of a semi-balanced type since the effective area against which the high pressure fluid from passageway 14 acts on the top of the plug is larger than the effective lower area of the plug on which the high pressure fluid is allowed to act when the plug 48 is in a closed position. As the aforementioned high pressure is applied along the inner elastic beveled surface of the upper seat portion 54 while the plug is in the closed solid line position shown in FIG. 1, the high pressure fluid will then assist in moving the plug seats 54 and 56 into a better leak tight seating engagement with the associated cage seats 58, 60.

As the plug 48 is forced downward toward the fully seated position by the combined action of the valve actuator and the unbalanced pressure of the fluid, annular lower chamfered seat 56 will be forced into fluid tight line seating engagement with the annular rigid edge 60 which constitutes the lower seat of cage 20.

Since the lower plug seat 56 and the associated cage seat 60 are of a rigid construction, the plug and cage seats 56 and 60 will be coined into fluid tight engagement with one another. The cage seat 60 then acts as a stop to prevent any further downward movement of the plug 48. This plug stopping action by the cage seat 60 will prevent the resilient deformable upper annular plug seat 54 from being moved downward beyond the position shown in dotted line in FIG. 3, a position whereat the elastic limit of the material from which the upper seat 54 is made will not be exceeded.

A valve constructed in accordance with the present invention was shown to provide a control valve which permits a substantially lower leakage value than the established standard .5 percent. More specifically, the use of the elastic seat 54 employed in the valve embodying the present invention advantageously reduces the leakage to a value of .01 percent.

Thus, it may be seen that there has been provided an improved valve featuring a resilient, deformable metal seat to allow automatic fluid tight engagement of the seats of the plug with the corresponding seats of the cage of a double seated valve for controlling the flow of fluids the temperature and pressure of which can vary over a wide range.

The embodiments of the invention in which an exclusive property or privilege is claimed are defined as follows:

1. A double seated cage valve for controlling the flow of fluids, said valve comprising
   a unitary cage member and a complementary hollow plug member formed of one piece construction,
   said cage member having an upper and a lower rigid seat,
   said plug member having a first seat means arranged for sealing engagement with said upper seat of said cage member and a second seat means arranged for sealing engagement with said lower seat of said cage member,
   said second seat means of said plug member being of rigid construction,
   said first seat means of said plug member being of a resiliently deformable frusto-conical construction and being of a thinner construction than the rest of the plug,
   said first and second seat means of said plug member being so spaced that as said plug is moved in a closing direction with respect to said cage member, said first seat means of said plug member engages said upper seat of said cage member before said second seat means of said plug member engages said lower seat of said cage member, whereby further movement of said plug member in said closing direction deforms said frusto-conical first seat means into intimate engagement with the associated upper seat and moves said second seat means into sealing engagement with said lower seat.

2. The double seated valve as defined in claim 1 wherein each cage seat is of an annular edge shape configuration.

3. The double seated valve as defined in claim 2 wherein the top surface area of said plug member is greater than the effective area of the bottom of said plug member annular seat and wherein the inner surface of said frusto-conical seat means provides an annular area against which the pressure of a fluid on the high pressure side of said valve acts and thereby aids in forcing said plug seat means into substantially leak tight relationship with said associated cage seats after the seat means of said plug have been moved into sealing engagement with the associated seats on said cage.

* * * * *